United States Patent Office 2,734,760
Patented Feb. 14, 1956

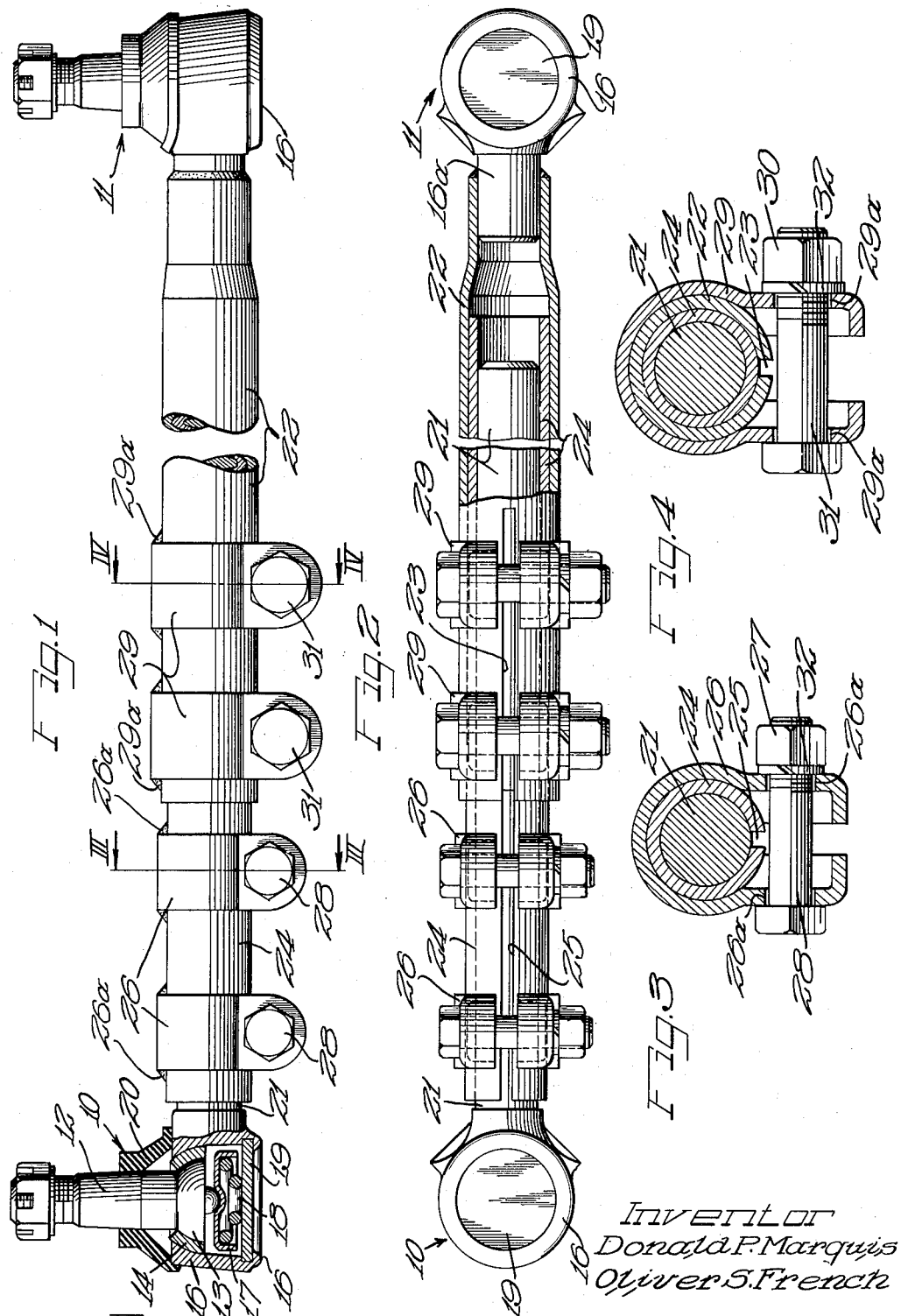

2,734,760

ADJUSTABLE TIE ROD

Donald P. Marquis, Farndale, and Oliver S. French, Detroit, Mich., assignors to Thompson Products, Inc., Cleveland, Ohio, a corporation of Ohio Application December 7, 1949, Serial No. 131,544

4 Claims. (Cl. 287—58)

The present invention relates generally to an adjustable joint adapted to vary the spacing dimension between axially separated centers and more particularly relates to adjustable tie rod and tie rod joint assembly wherein the distance between joint stud centers may be selectively varied within predetermined dimensional limits.

The present invention finds a particularly useful application when employed in the tie rod apparatus of a vehicular steering assembly, for example, in a row crop tractor where it is useful to vary the span of the front wheels.

In many of the tie rod assemblies heretofore provided, a rod has been attached to one socket and a tube attached to the other and a locking device has been employed to connect the rod to the tube at various positions. Such, however, are limited to adjustment within the length of the shortest link.

In accordance with the general features of the present invention, an adjustable tie rod is provided in which a far greater adjustment range is obtainable than has heretofore been possible. A rod-like stem is attached to a first socket and a tube-like stem is attached to a second socket. An intermediate tubular sleeve is also employed so that both the stem and the tubular sleeve may be telescopically cooperable and adjustable relative to one another to effect variations in the spacing between socket centers which variations may extend beyond the total length of the stem and tube. Clamping means are provided to lock the tie rod assembly in any one of various adjusted positions.

It is an object of this invention to provide an improved adjustable joint linkage adapted to vary the spacing dimension between spaced centers.

A further object of this invention is to provide an improved tie rod and tie rod end assembly capable of varying the spacing of the ends throughout a wide range.

Another object of the present invention is to provide a telescoped tie rod and tie rod end assembly which permits adjustment of the spacing of the ends within a range greater than the length of any one telescoped link.

Many other advantages, features and additional objects of the present invention will become manifest to those versed in the art upon making reference to the detail description which follows and the annexed sheet of drawings in which:

Figure 1 is an elevational view, partly in vertical section, of an adjustable tie rod assembly according to the present invention;

Figure 2 is a bottom plan view of the tie rod assembly shown in Figure 1 with parts broken away and with parts in horizontal section to show additional details of construction;

Figure 3 is a transverse cross sectional view taken on line III—III of Figure 1; and Figure 4 is a transverse cross sectional view taken on line IV—IV of Figure 1.

As shown on the drawings:

The tie rod and the tie rod joint assembly of this invention includes a first tie rod joint or socket 10 and a second tie rod joint or socket 11. Both of the sockets 10 and 11 may be identically constructed, the details of which are shown in the left hand side of Figure 1, wherein a ball stud 12 is provided having a ball head 13 surrounded by an annular bearing ring 14 presenting a segmented spherical bearing surface for the ball head 13.

The ball stud 12 is urged upwardly in a housing 16 by a retainer 17 held in abutment with the stud 12 by a spring 18 and a closure plate 19. After assembly, the housing 16 may be peened over along its lower edge periphery to secure the closure plate 19 in place. A dust cover 20 is also provided for the ball joint.

One of the sockets, as herein shown the socket 10, is provided with a solid rod-like stem 21.

The other socket, as herein shown the socket 11, is provided with a hollow tube-like stem 22. The tube-like stem 22 may be conveniently affixed in firm assembly with the socket 11 by telescoping an end of the tube over a short stem 16a on the joint housing and by welding the parts together.

The opposite end of the tube-like stem 22 may be axially slotted for a portion of its length as at 23 so as to promote contractability thereof.

A sleeve 24 in the form of a tubular element is also provided for the adjustable joint of the present invention and is so constructed as to define an outside diameter of a size approximately equal to the inside diameter of the tubular bore defined by the stem 22. The inside diameter of the tubular bore defined by the sleeve 24 is approximately equal in size to the outside diameter of the rod-like stem 21.

The rod-like stem 21, the tube-like stem 22 and the sleeve 24 may be assembled so as to be telescopically cooperable and adjustable relative to one another by inserting the rod-like stem 21 into the sleeve 24 and placing the tube-like stem 22 in surrounding relationship over the sleeve 24. By employing the sleeve 24, over which the tubular stem 22 may be clamped and through which the rod-like stem 24 may also be clamped, the distance between ball centers may be adjusted through a range greater than the entire length of the adjustable joint at its shortest adjustment. Moreover, since all of the elements of the adjustable joint are concentric with respect to one another, force applied to the assembly will be transmitted along a common axis including the heads 13 of the studs 12, thereby avoiding the introduction of offsets which might tend to cause bending of the adjustable joint.

In order to lock the adjustable joint of the present invention at various points of adjustment, appropriate clamping means may be provided. As herein embodied, C clamps 26 are welded as at 26a and are arranged to surround that portion of the sleeve 24 overlying the rod-like stem 21 and may be placed in clamping engagement therewith to lock the sleeve 24 in clamped assembly with the stem 21 by tightening a nut 27 threaded on a stud 28 extending through registering apertures 26a formed in each clamp 26.

It will be noted that the sleeve 24 may be provided with an axially extending slot 25 to promote contactability thereof.

One or more C clamps 29 may also be welded as at 29a and arranged to surround that portion of the tubular stem 22 overlying both the sleeve 24 and the rod-like stem 21 and may be tightened into clamping engagement therewith upon turning a nut 30 onto a stud 31 passing through registering apertures 29a formed in each of the C clamps 29.

Each of the clamping units 26 and 29 may be provided with a lock washer 32 against which the nuts 27 and 30 may be tightened.

It is contemplated that a person skilled in the art might suggest various minor modifications to the structure herein described by way of preferred embodiment and illustative example only, however, we do not propose to be limited to the precise details referred to for the sake of clarity but wish to embrace within the scope of this patent all such modifications as reasonably and properly fall within the scope of our contribution to the art.

We claim as our invention:

1. In a vehicular steering assembly having adjustable tie rod parts interconnecting transversely spaced apart pivotal joint members establishing steering linkage pivot points, the improvement of a first socket member for one of said joint members having a rod rigidly connected thereto, said rod having a substantially constant outside diameter extending from said first socket member at a point adjacent said one joint member, a second socket member for the other of said joint members, a tube connected to said second socket member and having a bore of substantially constant diameter extending from a point adjacent said other joint member, a separate tubular sleeve member intermediate to and concentric with said rod and said tube, said sleeve member having an unobstructed bore as long as said rod and adapted to completely receive said rod, said sleeve member having an unobstructed peripheral surface as long as the bore of said tube and adapted to be completely received within the bore of said tube, said rod, tube and sleeve thereby telescoping through a range of axial adjustment greater than the length of the assembly in its position of shortest axial adjustment to selectively vary the spacing between the centers of the socket members, first clamping means for fixedly securing said sleeve in axially adjusted position on said rod and second clamping means fixedly securing said sleeve in axially adjusted position within said tube.

2. An adjustable tie rod constructed in accordance with claim 1 wherein said first and second clamping means comprise contracting clamps and said sleeve and said tube are each axially split along a portion of their lengths for contraction by said clamping means about said rod and said sleeve respectively.

3. An adjustable tie rod constructed in accordance with claim 1 wherein the cooperating surfaces of said rod, said sleeve and the bore of said tube are smooth.

4. An adjustable tie rod constructed in accordance with claim 1 wherein said first clamping means is fixedly secured to one end of said sleeve adjacent said first socket member and said second clamping means is fixedly secured to the end of said tube remote from said second socket member.

References Cited in the file of this patent

UNITED STATES PATENTS

| | | |
|---|---|---|
| 487,544 | Simon | Dec. 6, 1892 |
| 573,456 | Evens | Dec. 22, 1896 |
| 678,642 | Chambers | July 16, 1901 |
| 752,423 | Smith | Feb. 16, 1904 |
| 930,406 | McDonald | Aug. 10, 1909 |
| 1,237,014 | Botty et al. | Aug. 14, 1917 |
| 1,537,330 | Buckendale | May 12, 1925 |
| 2,049,502 | Hufferd et al. | Aug. 4, 1936 |
| 2,513,942 | Johnson et al. | July 4, 1950 |

FOREIGN PATENTS

| | | |
|---|---|---|
| 10,833 | Great Britain | June 25, 1891 |
| 334,312 | Great Britain | Sept. 4, 1930 |
| 570,807 | Great Britain | July 24, 1945 |